Feb. 21, 1928.
B. F. KNELL
MUSIC RACK OR SUPPORT
Filed Oct. 16, 1924
1,660,169
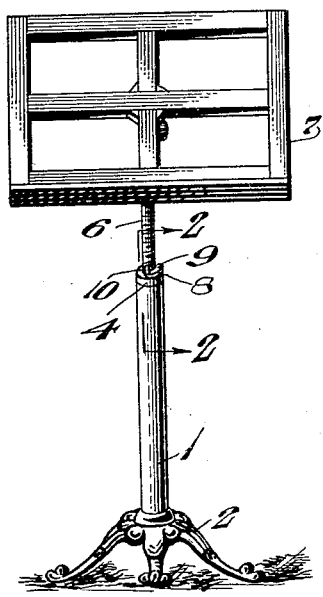
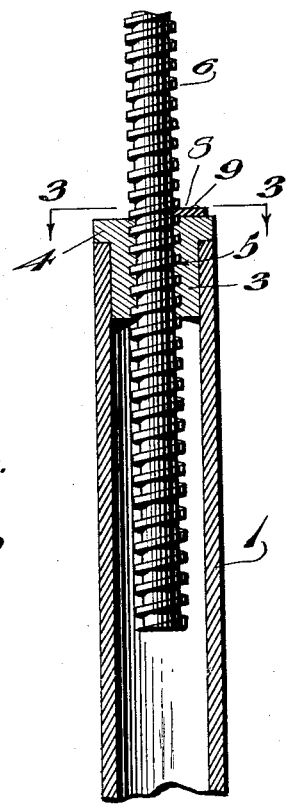
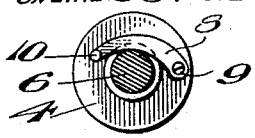
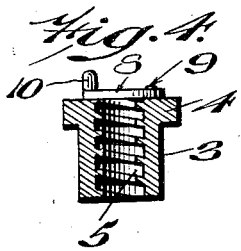
INVENTOR:
Benjamin F. Knell.
BY
ATTORNEYS.

Patented Feb. 21, 1928.

1,660,169

UNITED STATES PATENT OFFICE.

BENJAMIN F. KNELL, OF PHILADELPHIA, PENNSYLVANIA.

MUSIC RACK OR SUPPORT.

Application filed October 16, 1924. Serial No. 743,861.

This invention, generally stated, relates to music racks or supports and has more particular relation to means for vertically adjusting the same.

The leading object of the present invention may be said to reside in the providing of a simple, efficient, and comparatively inexpensive adjusting means for a music rack or support which may be adjusted vertically in an expeditious manner without the employment of sliding rods, adjusting nuts, and similar unsatisfactory constructions.

A further object of the present invention resides in the provision of general details of construction and arrangement and combination of parts for attaining the results sought by the said leading object.

A still further object of the present invention resides in the provision of a pivotal detent for interlocking the parts in adjusted position. Still other and further objects not at this time appearing will be hereinafter more particularly referred to.

The invention consists of the novel construction hereinafter described and finally claimed.

The nature, characteristic features and scope of the invention will be more fully understood from the following description taken in connection with the accompanying drawings forming part hereof, and in which:

Fig. 1 is a view in perspective of a music rack or support embodying features of the invention.

Fig. 2, is a fragmentary view in vertical section taken upon the line 2—2 of Fig. 1.

Fig. 3, is a view in cross-section taken upon the line 3—3 of Fig. 2.

Fig. 4, is a detached view in central section of the nut shown in Fig. 2.

For the purpose of illustrating my invention I have shown in the accompanying drawings one form thereof which is at present preferred by me, since the same has been found in practice to give satisfactory and reliable results, although it is to be understood that the various instrumentalities of which my invention consists can be variously arranged and organized and that my invention is not limited to the precise arrangement and organization of the instrumentalities as herein shown and described.

In the drawings the reference numeral 1 designates a tubular upright supported upon feet 2. Fitted to the top of upright 1 is a nut best seen in Fig. 4, which nut comprises a tubular portion 3 terminating at its top in a flange 4 preferably formed integral with the portion 3. The nut is internally screw threaded as at 5. In practice the tubular portion 3 of the nut is driven into the top of the upright 1 as clearly seen in Fig. 2, so that the flanged portion 4 of the nut rests upon the annular periphery of upright 1. In practice the tubular portion 3 of the nut is made of a diameter sufficiently large to snugly fit within the interior of upright 1. Having screw threaded relation with the nut just described is a screw threaded stem 6 arranged for vertical adjustment with respect to upright 1 and in parallelism with said upright. The screw threaded stem 6 carries at its top a rack 7 for the support of sheets of music. To raise or lower the rack 7 it is merely necessary to rotate said rack in any desired direction, thus causing stem 6 to be raised or lowered with respect to upright 1. In order to maintain the screw threaded stem 6 in adjusted position without danger of displacement I make use of a detent 8 pivoted as at 9 upon the flanged top of the nut, the free end of which detent is provided with a handle 10 which handle is vertically disposed as shown in Fig. 4. The detent 8 is formed upon an arc of a circle, as clearly shown in Fig. 3, so that when in normal or locking position the inner curved edge thereof may readily engage between adjacent threads of the stem 6, as clearly shown in Figs. 2 and 3. In this position of parts the stem 6 is securely maintained in adjusted position without danger of being displaced. By the above described arrangement and construction of parts a musician may readily adjust his music rack without loosening set screws and the like, which is very important since in the latter case it is necessary for the musician to use two hands, which is not always convenient. By the present construction of parts a musician may readily move detent 8 out of engagement with the screw threaded stem and revolve the rack 7 a few turns in the desired direction and secure the adjustment desired. A musician may readily do this with one hand. Another important feature resides in the fact that with sliding rods and thumb screws the parts frequently jamb so that considerable time is consumed in securing an adjustment of parts. By having the screw threaded stem 6 rotatable in the nut at the top of upright 1, jambing of parts is not likely to take place. While the upright 1 and portion 3 of the nut have been described as being tubular, obviously other shapes may be employed if desired.

Having thus described my invention, what I claim as new and desire to secure by Letters Patent, is:

A music rack comprising a hollow upright, a nut fixed with respect to the top of said upright by a driven fit and having a horizontal rectilinear top surface, a screw-threaded stem cooperatively engaging said nut for vertical adjustment with respect to said upright, a music rack on the top of said stem, and a horizontally disposed relatively thin detent pivotally mounted on the top of said nut for interlocking with the stem threads to lock said stem with respect to said nut, the operative edge of said detent being concave, and a pivot for said detent paralleling the vertical axis of said stem and engaging the top of said nut.

BENJAMIN F. KNELL.